(12) United States Patent
Hemmer et al.

(10) Patent No.: US 11,183,698 B2
(45) Date of Patent: Nov. 23, 2021

(54) FUEL CELL DEVICE AND METHOD FOR OPERATING A FUEL CELL DEVICE

(71) Applicant: ElringKlinger AG, Dettingen (DE)

(72) Inventors: Stefan Hemmer, Metzingen (DE); Peter Stahl, Metzingen (DE); Juergen Kraft, Metzingen (DE)

(73) Assignee: ElringKlinger AG, Dettingen (DE)

( * ) Notice: Subject to any disclaimer, the term of this patent is extended or adjusted under 35 U.S.C. 154(b) by 23 days.

(21) Appl. No.: 16/738,785

(22) Filed: Jan. 9, 2020

(65) Prior Publication Data

US 2020/0153005 A1 May 14, 2020

Related U.S. Application Data

(63) Continuation of application No. PCT/EP2018/068567, filed on Jul. 9, 2018.

(30) Foreign Application Priority Data

Jul. 14, 2017 (DE) ..................... 10 2017 115 871.5

(51) Int. Cl.
| | |
|---|---|
| *H01M 8/04225* | (2016.01) |
| *F16K 49/00* | (2006.01) |
| *H01M 8/04089* | (2016.01) |
| *H01M 8/0438* | (2016.01) |
| *H01M 8/04537* | (2016.01) |
| *H01M 8/04746* | (2016.01) |

(52) U.S. Cl.
CPC ....... *H01M 8/04225* (2016.02); *F16K 49/002* (2013.01); *H01M 8/04104* (2013.01); *H01M 8/04388* (2013.01); *H01M 8/04395* (2013.01); *H01M 8/04641* (2013.01); *H01M 8/04753* (2013.01)

(58) Field of Classification Search
CPC ......... H01M 8/04225; H01M 8/04104; H01M 8/04388; H01M 8/04395; H01M 8/04641; H01M 8/04753
See application file for complete search history.

(56) References Cited

U.S. PATENT DOCUMENTS

| | | |
|---|---|---|
| 8,250,855 B2 | 8/2012 | Kleinknecht |
| 2005/0112424 A1 | 5/2005 | Hirano et al. |
| 2008/0053530 A1 | 3/2008 | Knight et al. |

(Continued)

OTHER PUBLICATIONS

Machine translation of the written opinion.*

*Primary Examiner* — Amanda C. Walke
(74) *Attorney, Agent, or Firm* — Womble Bond Dickinson (US) LLP (57) ABSTRACT

A fuel cell device is provided, including a media system for supplying fluid media to electrochemical units of the fuel cell device and/or for discharging fluid media from the electrochemical units of the fuel cell device, wherein the media system includes at least one valve to which, in a standard operating state of the fuel cell device, an electrical standard input power is suppliable in order to maintain the valve in a desired valve state. The fuel cell device is able to be reliably started with as little effort as possible, even under frost conditions. The fuel cell device is switchable into a heating operating state in which an electrical heating input power that is greater than the electrical standard input power is suppliable to the at least one valve.

17 Claims, 2 Drawing Sheets

(56) References Cited

U.S. PATENT DOCUMENTS

| | | | |
|---|---|---|---|
| 2008/0105838 A1 | 5/2008 | Koenekamp | |
| 2008/0105843 A1 | 5/2008 | Koenekamp | |
| 2010/0071781 A1 | 3/2010 | Hatta | |
| 2015/0303498 A1* | 10/2015 | Nakamura | F16K 49/00 |
| | | | 429/434 |
| 2020/0075034 A1* | 3/2020 | Peleg | G10L 21/0272 |
| 2020/0153005 A1* | 5/2020 | Hemmer | H01M 8/04656 |
| 2020/0295390 A1* | 9/2020 | Klein | H01M 8/04783 |
| 2020/0335805 A1* | 10/2020 | Lynk | H01M 8/04225 |
| 2020/0335807 A1* | 10/2020 | Seidl | H01M 8/0662 |
| 2020/0358112 A1* | 11/2020 | Chatroux | H01M 8/04089 |

\* cited by examiner

FUEL CELL DEVICE AND METHOD FOR OPERATING A FUEL CELL DEVICE

CROSS-REFERENCE TO RELATED APPLICATIONS

This application is a continuation of international application number PCT/EP2018/068567 filed on Jul. 9, 2018 and claims the benefit of German application number 10 2017 115 871.5 filed on Jul. 14, 2017, which are incorporated herein by reference in their entirety and for all purposes.

FIELD OF DISCLOSURE

The present invention relates to a fuel cell device which comprises a media system for supplying fluid media to electrochemical units of the fuel cell device and/or for removing fluid media from the electrochemical units of the fuel cell device, wherein the media system comprises at least one valve to which, in a standard operating state of the fuel cell device, an electrical standard input power is suppliable in order to maintain the valve in a desired valve state.

BACKGROUND OF THE INVENTION

Fuel cell devices that enable the operation of fuel cells or fuel cell stacks typically comprise one or a plurality of fuel cell stacks and peripheral assemblies for completing the following tasks:
  tapping and regulating the electrical power;
  supplying the required reaction media to the fuel cell stack and discharging the reaction media from the fuel cell stack;
  cooling the fuel cell stack;
  monitoring, controlling, and regulating system functionalities.

The media system, in particular for supplying the anode-side fluid (fuel gas), the cathode-side fluid (oxidizing agent), and the cooling fluid, also contains, in addition to conduits or ducts for guiding the media, functional groups for capturing measured variables (for example pressure, temperature, volumetric flow, mass flow, moisture, concentrations, etc.) as well as active or passive assemblies like, for example, valves, moisteners, water separators, etc.

The assemblies or components that have the described functionalities and are also referred to as functional groups may be arranged in the immediate proximity of fuel cell stacks and also be mechanically connected thereto. Said assemblies or components may be directly integrated into constituent parts of the fuel cell stack like, for example, end plates between which the electrochemical units of the fuel cell device are braced against each other; as a result, in particular the advantage of a short distance between the functional groups and the fuel cell stack is achieved and/or the number of components and/or the system complexity is/are reduced by an integration.

The reaction media, in particular an anode-side fuel gas and a cathode-side oxidizing agent, are supplied to the fuel cell stack by means of the media system and are discharged from the electrochemical units of the fuel cell device.

The media system of the fuel cell device may comprise an anode-side media system, a cathode-side media system, and/or a coolant media system.

In order to increase the utilization rate of the reaction media, the reaction media may be guided from the outlet of the fuel cell stack in a recirculation circuit back to the inlet of the fuel cell stack. Active pumps or compressors or passive jet pumps (also called ejectors) may be used for this recirculation.

In order to avoid the entry of liquid water, for example through the reaction media inlet of the fuel cell stack, into the fuel cell stack, active or passive water separators may be used in the recirculation circuit. In order to remove the condensation from said water separators, active or passive drainage valves may be used.

The anode-side media system may be cyclically opened toward the surroundings of the fuel cell device for a short time by way of a purge valve in order to discharge water that has accumulated in the anode-side media system and/or water vapor as well as exhaust gas, and to increase the hydrogen concentration in the anode-side media system.

In known fuel cell devices, active or passive valves are used in the media system of the cathode-side fluid, which ensure the gas-tight closure of the fuel cell stack at rest and/or regulate or control fluid flows. Such valves may be configured in particular as pressure-regulating valves, medium shut-off valves, moistener bypass valves, drainage valves, etc.

Active or passive valves that regulate or control fluid flows are also used in the anode-side media system. Said valves may be configured, for example, as pressure-regulating valves, medium shut-off valves, drainage valves, or purge valves, etc.

Both fuel cell devices that are used in stationary applications as well as fuel cell devices that are used in mobile applications typically must be able to be stored and started under frost conditions, i.e. at temperatures below 0° C.

When temperatures of below 0° C. prevail in the fuel cell device, water may freeze in the media system, in particular in the anode-side media system and in the cathode-side media system, and block or change flow paths. The functions of actuators, in particular of valves, and/or of sensors of the fuel cell device may also be impaired by the formation of ice. Due to their good heat conduction, especially metallic components cool down faster, in appropriate environmental conditions, than components with poorer heat conduction and thus constitute a condensation point at which there is an increased risk of ice formation.

It may therefore be necessary to preheat individual assemblies, regions or fluids in the fuel cell device with additional heating elements in the case of starting the fuel cell device under frost conditions, in order to thaw icings or to enable the transport of water out of regions in which ice formation may occur. This results in increased expenditure in the fuel cell device, which reduces the efficiency, enlarges the installation space, and increases the costs.

SUMMARY OF THE INVENTION

The object underlying the present invention is to create a fuel cell device of the kind stated at the outset, which is able to be reliably started with as little effort as possible, even under frost conditions.

This object is achieved in accordance with the invention in a fuel cell device with the features of the preamble of claim 1 in that the fuel cell device is switchable into a heating operating state in which an electrical heating input power that is greater than the electrical standard input power is suppliable to the at least one valve.

The concept underlying the present invention is thus to use an electrically, in particular electromagnetically or electromotively, actuatable valve which is used in the media system of the fuel cell device not only for controlling or regulating a fluid flow, but also for heating the fuel cell device.

If ice is present in the media system when starting the fuel cell device, the temperature of the value itself and the immediate vicinity of the value may be raised above the melting temperature of water by means of the increased electrical heating input power, which is converted into heat.

In the case of an electromagnetically actuatable valve, the actuating device of which comprises a magnetic coil, the magnetic coil of the valve may be applied, for example in the heating operating state, with a heating input power that is increased in relation to the standard input power. The heating input power of the valve during the heating operation is hereby selected preferably such that overheating of the valve does not occur.

The valve in the heating operating state may hereby be permanently maintained in a constant switch position, for example in the valve state "open" or in the valve state "closed".

If the valve comprises a valve anchor, the valve anchor thus thereby typically abuts against one of the end stops of the valve.

Alternatively hereto, a valve, which is returnable to a resting valve state by means of resilient force or by means of gravity, may be maintained in an arbitrarily selected valve state between the limit valve states "open" and "closed" by means of a correspondingly high heating input power.

Furthermore, it is possible to apply a valve in the heating operating state with a heating operating power below the switching power necessary for a switching operation of the valve, without changing the switch position of the valve. Thus a valve that is closed in the non-energized state (so-called NC valve) or is open in the non-energized state (so-called NO valve) may remain in the closed state and in the open state, respectively, while it is applied with a heating input power, which is below the switching power, in order to heat the valve.

Furthermore, a valve without a voltage rectifier, which is in a switch position that is defined by an end stop, may be applied with a heating voltage, the polarity of which is opposite to the polarity of a switching voltage required for a change of the switch position, in order to heat the valve without the switch position of the valve changing.

The heating voltage with which the valve in the heating operating state is applied may hereby be selected, in principle, arbitrarily high, provided the electrical and the thermal loading capacity of the valve and of the components surrounding the valve is not exceeded.

Furthermore, a valve in the heating operating state may be switched between discrete switch positions, for example between the switch position "open" and "closed", by means of a control with pulse width modulation at a high frequency (preferably at a frequency greater than 1 Hz).

The dwell time in the respective switch position may hereby be varied such that the flow rate through the valve is continuously adjustable to a desired value between nearly full flow rate and a flow rate of nearly zero.

By quickly switching between the switch positions, the heating input power may be significantly increased in comparison to the minimum required switching power, at least provided that no damage to the valve, in particular by overheating, can occur.

As a result of the configuration in accordance with the invention of a fuel cell device, additional heating elements in the fuel cell device may be omitted, whereby the production and operating expenditure of the fuel cell device are reduced.

The introduction of the heating power directly at a valve is further particularly favorable because it is precisely there that an increased risk of an impairment in the system function due to ice formation exists.

The present invention offers the advantage that existing valve types may be used without being altered and/or that the heating function in accordance with the invention can be achieved with minimal adaptations of the existing valve types.

Preferably only the type of control of the valve needs to be adapted in order to apply said valve in the heating operating state with an increased heating input power.

The control of the at least one valve of the fuel cell device preferably takes place by means of a control device of the fuel cell device or by means of an external control device.

In order to determine whether the fuel cell device needs to be switched into the heating operating state, provision may be made for the fuel cell device to comprise a temperature sensor, by means of which the falling of a temperature of a region of the fuel cell device to a temperature below 0° C. is preferably determinable.

Such a temperature sensor may be arranged, for example, on or in the valve that is to be heated.

When such a falling of the temperature is determined, the fuel cell device is switched into the heating operating state.

In a preferred embodiment of the invention, provision is made for the valve, by means of which the fuel cell device is heatable, to be electromagnetically or electromotively actuatable.

The electrical heating input power of the valve is preferably limitable such that overheating of the valve is avoided.

For determining whether there is a risk of overheating, a temperature sensor may be used, which is arranged on or in the valve that is to be heated.

The valve may be permanently closed or permanently open in the heating operating state.

Alternatively or in addition hereto, provision may be made for the valve in the heating operating state to be maintainable in a predetermined valve state between the completely closed state and the completely open state.

The electrical heating input power which is suppliable to the valve in the heating operating state is preferably below a switching threshold input power that is required for switching the valve into a different valve state.

Provision may be made for the valve in the heating operating state to be able to be applied with an electrical heating voltage, the polarity of which is opposite to the polarity of an electrical switching voltage required for switching the valve into a different valve state.

Alternatively or in addition hereto, provision may be made for the valve in the heating operating state to be controllable with pulse width modulation.

Provision may further be made for the electrical heating input power supplied to the valve in the heating operating state to be variable in dependence on a measured variable correlating with a formation of ice in the media system of the fuel cell device.

Such a measured variable may be, in particular, a temperature or a pressure in a supply conduit, by means of which a cathode-side fluid or an anode-side fluid or a coolant is supplied to the fuel cell device.

Provision may be made for the valve in the heating operating state to remain in a predetermined valve state.

Alternatively hereto, provision may be made for the valve in the heating operating state to change between a plurality of different valve states.

In a particular embodiment of the invention, provision is made for the fuel cell device to comprise a measuring device for determining an electrical internal resistance of an actuating device of the valve. When the electrical internal resistance rises over a threshold value, this indicates possible overheating of the valve. The heating input power with which the valve is applied is therefore preferably reduced when such a rise of the electrical internal resistance of the actuating device of the valve beyond the threshold value is determined.

The at least one valve which is useable for heating the fuel cell device may be configured, for example, as a medium shut-off valve, as a pressure-regulating valve, as a drainage valve, as a purge valve, or as a combined purge/drainage valve.

In a particular embodiment of the invention, provision may be made for the fuel cell device to comprise a pressure sensor and/or a concentration sensor, from the signal of which it is determinable whether a blockage due to ice formation is present in the media system, wherein the fuel cell device is switchable into the heating operating state or into the standard operating state in dependence on the result of the determination.

For example, the pressure of the anode-side medium at the anode gas inlet of the fuel cell stack or the pressure of the cathode-side medium at the cathode gas inlet of the fuel cell stack may be measurable by means of the pressure sensor.

For example, a hydrogen concentration in the media system, in particular in the anode-side media system or in the cathode-side media system, may be measurable by means of the concentration sensor.

The present invention further relates to a method for operating a fuel cell device which comprises a media system for supplying fluid media to electrochemical units of the fuel cell device and/or for discharging fluid media from the electrochemical units of the fuel cell device, wherein the media system comprises at least one valve.

The further object underlying the present invention is to create such a method for operating a fuel cell device, by means of which the fuel cell device is reliably startable with as little effort as possible, even under frost conditions.

This object is achieved in accordance with the invention by a method in accordance with Claim 15, wherein the method comprises the following:
  determining whether there is a risk of ice formation in the media system of the fuel cell device;
  switching the fuel cell device into a standard operating state or into a heating operating state in dependence on the result of the determination;
  supplying an electrical standard input power to the valve in order to maintain the valve in a desired valve state when the fuel cell device is in the standard operating state; and
  supplying an electrical heating input power to the valve when the fuel cell device is in the heating operating state;
  wherein the heating input power is greater than the standard input power.

Particular embodiments of the method in accordance with the invention have already been described above in conjunction with particular embodiments of the fuel cell device in accordance with the invention.

The fuel cell device in accordance with the invention is suitable in particular for use in carrying out the method in accordance with the invention.

The heating input power of the valve is preferably at least 10%, in particular at least 50%, particularly preferably at least 100% greater than the standard input power.

The valve may preferably have at least two different states in the heating operating state: one state in which the valve is only heated, without the switch position of the valve being changed, and one state in which the valve is heated and at the same time is switched from one switch position into another switch position of the valve.

In accordance with the invention, at least one valve which is arranged in a media system of a fuel cell device is used, by means of the electrical input power with which the valve is applied, to heat the valve itself and its surroundings.

The valve used for heating the fuel cell device is preferably electromagnetically or electromotively actuatable.

In principle, the valve may have any switch positions and connection variants.

For example, a directional valve with the connection type 2/2, with the connection type 3/2, or with another connection type may be used.

The valve may preferably adopt different switch states by reversing the polarity of an electrical input voltage of the valve.

Alternatively or in addition hereto, provision may be made for the valve to be returned to a valve state by means of resilient force and/or by means of gravity.

The valve may be a discrete switching valve, a proportional valve, a timing valve, or a regulating valve.

When the valve is electromagnetically actuatable and the actuating device of the valve comprises a coil arrangement which moves a valve body, for example a valve anchor, by generating a magnetic field, the valve is thus preferably able to be applied with a heating input power which is higher than the standard input power. The valve in the heating operating state is heatable as a result of the ohmic power loss of the coil arrangement.

The heating input power is hereby preferably above the minimum switching power necessary for switching the valve.

The heating input power in the heating operating state is preferably limited such that overheating of the valve does not occur.

In particular, provision may be made for the heating input power during the entire heating operation to be selected such that it corresponds to the maximum value of the input power at which at no time does a damaging overheating of the valve or of another component of the fuel cell device occur.

In one embodiment of the invention, provision may be made for the energization of the valve for the purpose of heating to be reduced in relation to a maximum value, provided that a measured variable, for example a measured temperature which is measured at a suitable location in the fuel cell device, indicates that there is no impairment of the functionality of the fuel cell device due to ice formation or that a possible impairment is within an acceptable scope.

As a result of this, a fast heating operation and/or a fast melting of ice present in the fuel cell device is ensured.

The heating input power which is used for heating the valve may be introduced continuously or intermittently into the valve.

When continuously introducing the heating input power, the valve preferably remains in a switch position of the valve during the heating operation.

When intermittently introducing the heating input power, for example by controlling the valve with a pulse width modulated signal, the switch position of the valve in the heating operating state is constantly varied.

The dwell time in the different switch positions of the valve may thereby be varied such that the flow rate of a fluid medium through the valve is continuously settable, for example from a flow rate of nearly zero up to a maximum flow rate.

The valve may remain in a discrete switch state while heating in the heating operating state.

Alternatively thereto, the valve may switch cyclically between two or more switch states by means of intermittent energization in the heating operating state. In particular, a monostable valve or a bistable valve may hereby be used.

The valve may be open or closed while energizing for the purpose of heating.

The switch position of the valve may be varied during the heating operating state by reversing the polarity of the input voltage of the valve. The valve may thereby, in particular, also continue to fulfill its function for opening or closing a media chamber.

The internal resistance of the valve is preferably measurable in order to determine, in particular, the internal temperature of the valve from the measured value of the internal resistance. This information is useable for protecting the valve and its surroundings from thermal overload during the heating operating state.

In order to be able to heat, by means of the valve, a region of the fuel cell device that is as spatially large as possible, provision may be made for the thermal conductivity of the components of the fuel cell device surrounding the valve to be increased by selecting suitable materials.

In particular, metallic materials or plastic materials with an additive which increases the thermal conductivity, for example with a ceramic, a mineral, and/or a metallic additive, are useable as materials for the valve and/or for components of the fuel cell device surrounding the valve.

The valve that is useable for heating the fuel cell device is preferably arranged adjacently to a component of the fuel cell device, the function of which cannot be ensured or can only be ensured to a limited extent under frost conditions.

In particular, provision may be made for the valve to be arranged adjacently to a nozzle, a flow path of an anode gas or a cathode gas, a sensor (in particular a temperature sensor or a pressure sensor) or a water separator.

The valve that is useable for heating the fuel cell device may be configured in particular as a shut-off valve on the anode side of the media system, as a shut-off valve on the cathode side of the media system, as a pressure-regulating valve on the anode side of the media system, as a pressure-regulating valve on the cathode side of the media system, as a drainage valve on the anode side of the media system, as a drainage valve on the cathode side of the media system, or as a purge valve.

A drainage valve is used in particular for separating excess condensation and/or water from the anode side of the media system or from the cathode side of the media system.

A purge valve is used in particular for purging an anode-side gas chamber of the fuel cell device or a cathode-side gas chamber of the fuel cell device.

Further features and advantages of the invention are the subject matter of the subsequent description and the illustrative depiction of an exemplary embodiment.

BRIEF DESCRIPTION OF THE DRAWINGS

The same or functionally equivalent elements are provided with the same reference numerals in all Figures.

DETAILED DESCRIPTION OF THE INVENTION

Figure 1:
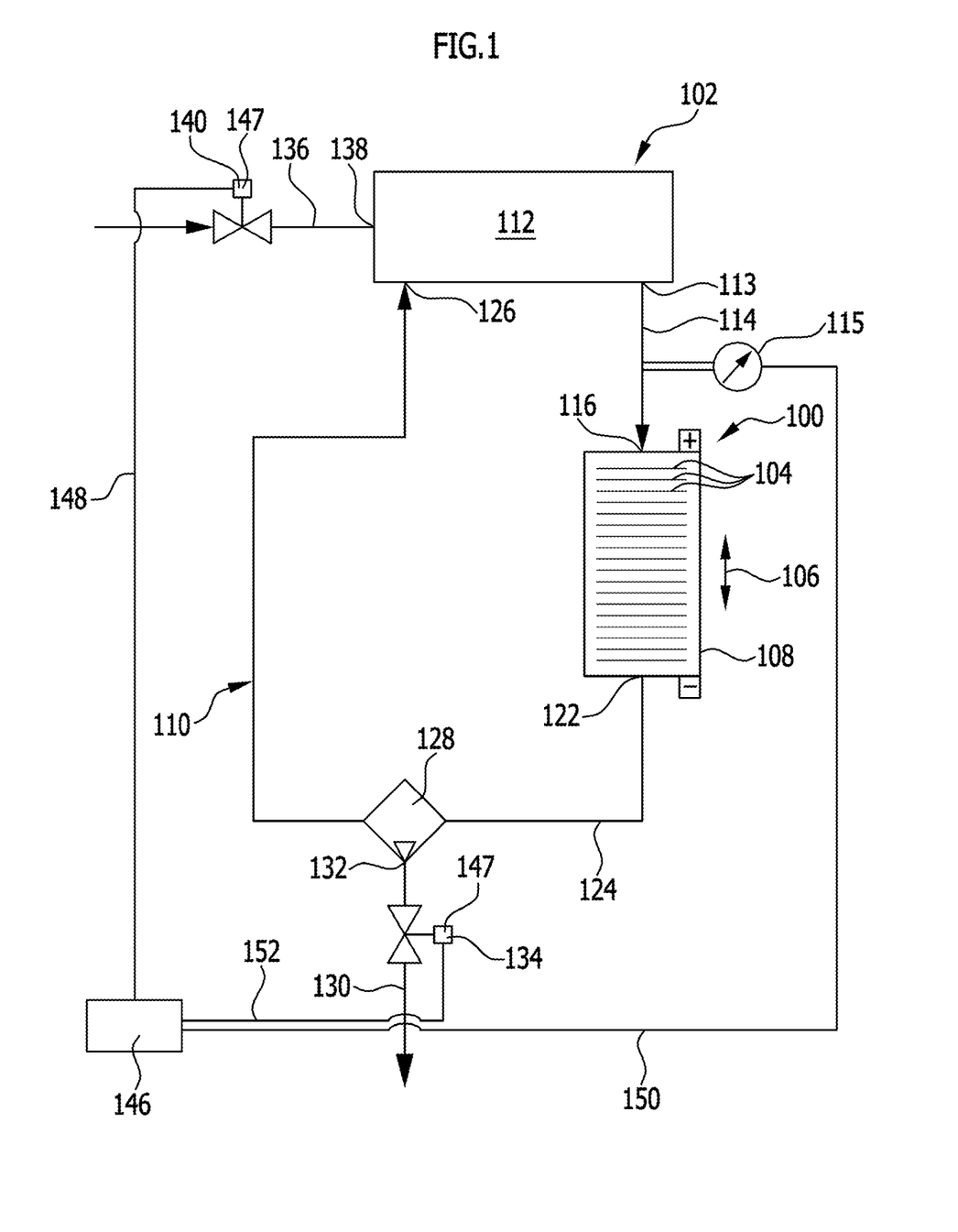
FIG. 1 shows a piping and instrumentation diagram (P&ID) of a part of a media system of a fuel cell device, wherein the media system comprises a pressure-regulating valve and a purge/drainage valve.
Figure 2:
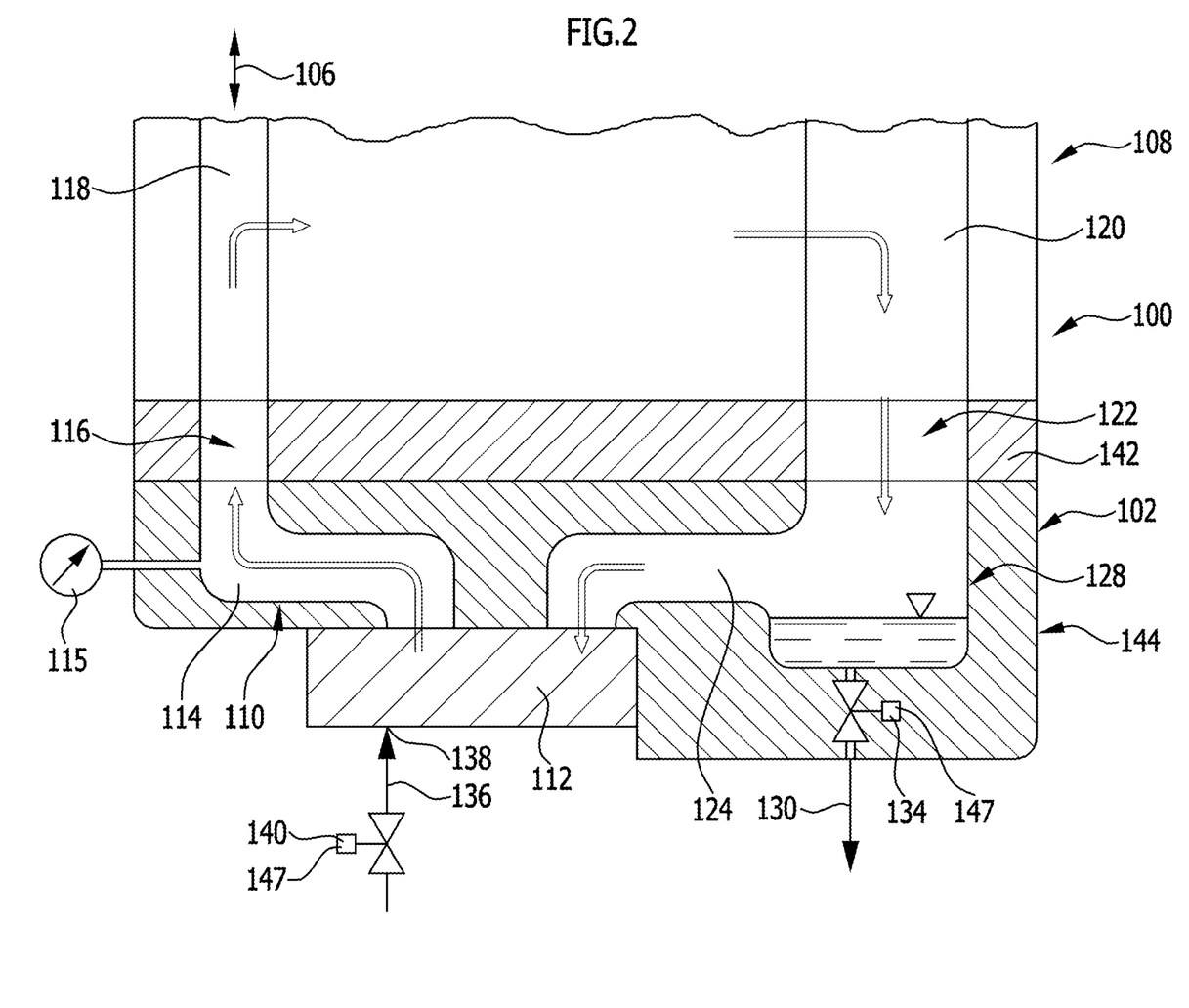
FIG. 2 shows a partial cross section through the fuel cell device with the pressure-regulating valve and the purge/drainage valve.

A fuel cell device which is partially depicted in FIGS. 1 and 2 and is designated as a whole with 100 comprises a media system 102 for supplying fluid media to electrochemical units 104 of the fuel cell device 100 which are stacked successively in a stack 108 along a stacking direction 106, and/or for discharging fluid media from the electrochemical units 104 of the fuel cell device 100.

Media supplied to the electrochemical units 104 may be, in particular, a fuel gas, an oxidizing agent, and/or a coolant.

Media discharged from the electrochemical units 104 may be, in particular, an anode exhaust gas, a cathode exhaust gas, and/or a coolant.

The piping and instrumentation diagram in FIG. 1 shows a section of the media system 102 which contains a recirculation circuit 110 for a fuel gas of the fuel cell device 100.

The recirculation circuit 110 comprises a recirculation element 112 which has an anode gas outlet 113 which is connected via an anode gas supply conduit 114 to an anode gas inlet 116 of the stack 108 of electrochemical units 104.

A pressure sensor 115 is arranged on the anode gas supply conduit 114.

As can be seen in FIG. 2, the anode gas inlet 116 is in fluidic connection with an anode gas supply channel 118 which extends in the stacking direction 106 through the stack 108.

Such an anode gas supply channel 118 is also referred to as an anode gas manifold.

By means of the anode gas supply channel 118, the anode gas is distributed to the anode-side gas chambers of the successive electrochemical units 104 in the stacking direction 106.

From the anode-side gas chambers of the electrochemical units 104, (partially electrochemically converted) anode gas, which may also be referred to as anode exhaust gas, reaches an anode gas discharge channel 120 which extends in the stacking direction 106 through the stack 108 and is in fluidic connection with an anode gas outlet 122 of the stack 108.

From the anode gas outlet 122 of the stack 108, an anode gas return conduit leads 124 to an anode gas return inlet 126 of the recirculation element 112.

A water separator 128 is arranged in the anode gas return conduit 124.

Water in the water separator 128 that has been separated from the anode gas is dischargeable via a drainage conduit 130 which is connected to a drainage outlet 132 of the water separator 128.

A purge/drainage valve 134 is arranged on the drainage conduit 130.

When the purge/drainage valve 134 is open, a purge gas is also dischargeable from the recirculation circuit 110 by way of the drainage outlet 132 and the drainage conduit 130.

Fresh fuel gas is suppliable to the recirculation circuit 110 via a fuel gas supply conduit 136 which is connected to a fuel gas supply inlet 138 of the recirculation element 112.

A pressure-regulating valve 140 is arranged in the fuel gas supply conduit 136.

The pressure-regulating valve 140 serves to control or to regulate the fluid flow of the fuel gas through the fuel gas supply conduit 136 in the operation of the fuel cell device 100 and to block the fuel gas supply conduit 136 when no fuel gas is to be supplied to the fuel cell device 100.

The purge/drainage valve 134 serves to avoid the entry of liquid water into the stack 108 through the anode gas inlet 116.

Furthermore, the anode-side media system 102 may be cyclically opened toward the surroundings of the fuel cell device 100 for short periods of time via the purge/drainage valve 134 in order to discharge water accumulated in the media system, as well as water vapor and exhaust gas, and to increase the hydrogen concentration.

As can be seen in the sectional depiction of FIG. 2, the anode gas inlet 116 and the anode gas outlet 122 of the stack 108 may be configured as through-openings in an end plate 142 of the stack 108.

The electrochemical units 104 may be braced between the end plate 142 and a further (not depicted) end plate of the stack 108.

The water separator 128, the anode gas return conduit 124, the anode gas supply conduit 114, the pressure sensor 115 and/or the recirculation element 112 may be integrated into a media module 144 of the fuel cell device 100 that is in contact with the end plate 142.

Only the anode side of the media system 102 is graphically represented and described above.

The media system 102 of the fuel cell device 100 may also comprise a correspondingly configured cathode side (not depicted).

The pressure-regulating valve 140 and the purge/drainage valve 134 and, as the case may be, other (not depicted) valves of the media system 102 are configured as active valves 147 which are electrically, in particular electromagnetically or electromotively actuatable.

In particular, said valves 147 may be directly controlled, electromagnetically actuated plate anchor valves or solenoid plunger valves.

The pressure-regulating valve 140 serves to ensure the gas-tight closure of the stack 108 at rest and to control or to regulate the supply of fresh fuel gas into the recirculation circuit 110 as necessary.

The flow through the pressure-regulating valve 140 may be set in particular in dependence on a measured pressure value which is determined by means of the pressure sensor 115.

The pressure-regulating valve 140 may be configured in particular as an electromagnetically actuatable valve which is controllable by means of pulse width modulated signals.

Any flow rates between maximum flow and minimum flow (corresponding to a flow of zero) may hereby be set by switching with a high frequency between the switch positions "open" and "closed" and by the dwell times in the respective switch positions being modulated depending on the desired flow rate.

The control of the pressure-regulating valve 140 is effected by a control device 146 of the fuel cell device 100 (see FIG. 1) which is connected to the pressure-regulating valve 140 by way of a control line 148.

The control device 146 may further be connected to the pressure sensor 115 by way of a signal line 150.

Furthermore, the control device 146 may be connected to the purge/drainage valve 134 by way of a control line 152.

When the fuel cell device 100 is in a standard operating state, an electrical standard input power is thus supplied to the pressure-regulating valve 140 in order to maintain the valve 147 in the respective desired valve state ("open" or "closed").

When the fuel cell device is subject to a low ambient temperate, for example a temperature of less than 0° C., the control device 146 of the fuel cell device 100 is thus placed into a heating operating state in which an electrical heating input power that is greater than the electrical standard input power is suppliable to the pressure-regulating valve 140 in order to maintain the valve 147 in the respective desired valve state ("open" or "closed").

This may be achieved, for example, by the switching voltage, which is applied for switching the valve 147 and with which a coil arrangement of an electromagnetic actuating device of the valve 147 is applied, being increased in the heating operating state in relation to the switching voltage in the standard operating state of the fuel cell device 100.

Alternatively or in addition hereto, provision may be made for the frequency with which the valve 147 is switched back and forth between the two valve states "open" and "closed" to be higher in the heating operating state than in the standard operating state.

Due to the increased ohmic power loss of the actuating device of the valve 147, in particular of a coil arrangement of the valve 147, in the heating operating state relative to the standard operating state, the valve 147 is thus heated in the heating operating state. The heat generated by the increased internal ohmic losses leads to the valve body heating up, and adjoining regions and components of the media system 102 of the fuel cell device 100, in particular flow channels of the media system 102, are also heated, and ice that is present in the media system 102 under frost conditions is thawed.

For protecting from thermal overload, the internal resistance of the valve 147 in the heating operating state of the fuel cell device 100 may be used to determine the internal temperature of the valve 147 and to reduce the electrical heating input power with which the valve 147 is applied when said internal temperature of the valve 147 rises to too high a value.

The purge/drainage valve 134 is cyclically opened by the control device 126 in order to first separate the water that has accumulated in the water separator 128 out of the anode-side media system 102 and then to separate gas, in particular exhaust gas, with a proportion of fuel gas and water vapor, out of the anode-side media system 102.

The liquid water that has accumulated in the water separator 128 should be removed as completely as possible in an emptying operation, while only a definite amount of gaseous substances should be discharged.

In order to always discharge an amount of gaseous substances that is as constant as possible, the pressure measured in the region of the anode gas inlet 116 of the stack 108 by means of the pressure sensor 115 may be used to determine the time at which the liquid water is removed from the water separator 128 and mainly only gaseous substances are discharged from the water separator 128. The pressure in the anode-side media system 102 drops faster during the discharge of gaseous substances in dependence on the opening time of the purge/drainage valve 134 than during the discharge of liquid water.

The purge/drainage valve 134 is configured, for example, as an electromagnetically controlled 2/2 directional valve without a rectifier, which valve is preferably closed without current by means of a restoring spring. Such a valve 147 is referred to as a monostable valve. Because a valve 147 without a rectifier is used, an input voltage with the correct polarity must be applied in order to open the valve 147.

When the fuel cell device 100 is in the heating operating state, the purge/drainage valve 134 is applied by the control device 1146 with an electrical heating input power that is higher in comparison to the electrical standard input power in the standard operating state of the fuel cell device 100.

The polarity of the heating input voltage is hereby preferably selected such that the valve 147, in principle, remains closed. As necessary, the valve 147 may be cyclically reversed in polarity and thus opened for a short time, which is preferably less than 2 seconds, in order to discharge water that has accumulated in the water separator 128 and/or anode gas from the anode-side gas chambers of the electrochemical units 104.

The heat generated in the purge/drainage valve 134 in the heating operating state due to internal ohmic losses causes the valve body to heat up. Adjoining regions and components of the media system 102, in particular flow channels of the media system 102, are hereby also heated, and ice that may be present in the media system 102 is thawed.

In a variant of this embodiment described above, the purge/drainage valve 134 is configured as a pulse width modulated valve (PWM valve). The energization of the electromagnetic actuating device of the valve 147 is thereby interrupted or the input voltage of the actuating device is reversed in polarity in order to cyclically switch the valve 147 into the valve states "open" and "closed". The dwell time in the respective valve states is thereby varied such that the volumetric flow flowing though the valve 147 is continuously set to a desired value between the minimum flow rate (zero) and the maximum flow rate.

In the heating operating state of the fuel cell device 100, the pulse width modulation of the purge/drainage valve 134 is set by the control device 146 such that the purge/drainage valve 134 allows a minimum possible through-flow, in which it is possible to switch cyclically between the valve states "open" and "closed".

In a further (not depicted) variant of this embodiment, instead of a combined purge/drainage valve 134, a separate purge valve and a separate drainage valve are used, which both are arranged in the region of the anode-gas outlet 122 of the stack 108.

These two separate valves may be configured as monostable 2/2 NC directional valves. Such directional valves are closed in the currentless state.

The outlets of both valves may be in fluidic connection with an outlet of a cathode side of the media system of the fuel cell device 100. A hydrogen sensor may be arranged in this outlet region of the fuel cell device 100.

In the heating operating state of the fuel cell device 100, the purge valve and the drainage valve are each applied with an increased heating input power for heating the purge valve and the drainage valve and the surroundings thereof. In this case, first both valves are opened. By way of the measurement and analysis of the anode-side gas pressure, by means of the pressure sensor 115, and the measurement and analysis of the hydrogen concentration in the outlet region of the stack 108, by means of the (not depicted) hydrogen sensor, the control device 146 determines whether gas and/or condensation are flowing through the purge valve and the drainage valve or whether said valves are blocked by ice that has formed in the media system 102.

When a flow through the purge valve and the drainage valve is determined, the heating operation is interrupted (by applying the purge valve and the drainage valve with an increased electrical heating input power) and the fuel cell device 100 is switched into the standard operating state.

When no flow through the purge valve and the drainage valve with gas or with condensation is determined, said valves 147 are energized by the control device 146 with an increased electrical heating input power until such a through-flow is determined.

In order to be able to heat a spatial region of the media system 102 of the fuel cell device 100 that is as large as possible by means of the purge/drainage valve 134 and/or by means of the pressure-regulating valve 140, it is favorable if the thermal conductivity of the components surrounding the respective valve 147 is increased through the selection of suitable materials, in particular through the selection of suitable materials for the media module 144.

In particular, provision may be made for metallic materials or plastic materials with an additive which increases the thermal conductivity thereof, in particular with a ceramic additive, a mineral additive, and/or a metallic additive, may be used as materials with an increased thermal conductivity.

In particular, the media module 144 may be formed of a metallic material or of a plastic material with a ceramic, mineral, and/or metallic additive that increases the thermal conductivity thereof.

The invention claimed is:

1. A fuel cell device, comprising a media system for supplying fluid media to electrochemical units of the fuel cell device and/or for discharging fluid media from the electrochemical units of the fuel cell device,
   wherein the media system comprises at least one valve to which, in a standard operating state of the fuel cell device, an electrical standard input power is suppliable in order to maintain the valve in a desired valve state,
   wherein the fuel cell device is switchable into a heating operating state in which an electrical heating input power that is greater than the electrical standard input power is suppliable to the at least one valve, and
   wherein the valve in the heating operating state is controllable with pulse width modulation.

2. The fuel cell device in accordance with claim 1, wherein the valve is electromagnetically or electromotively actuatable.

3. The fuel cell device in accordance with claim 1, wherein the electrical heating input power is limitable such that overheating of the valve is avoided.

4. The fuel cell device in accordance with claim 1, wherein the valve in the heating operating state is permanently closed or permanently open.

5. The fuel cell device in accordance with claim 1, wherein the valve in the heating operating state is maintainable in a predetermined valve state between the completely closed state and the completely open state.

6. The fuel cell device in accordance with claim 1, wherein the electrical heating input power suppliable to the valve in the heating operating state is below a switching threshold input power which is required for switching the valve into a different valve state.

7. The fuel cell device in accordance with claim 1, wherein the valve in the heating operating state is able to be applied with an electrical heating voltage, the polarity of which is opposite to the polarity of an electrical switching voltage required for switching the valve into a different valve state.

8. The fuel cell device in accordance with claim 1, wherein the electrical heating input power supplied to the valve in the heating operating state is variable in dependence on a measured variable correlating with formation of ice in the media system of the fuel cell device.

9. The fuel cell device in accordance with claim 1, wherein the valve in the heating operating state remains in a predetermined valve state.

10. The fuel cell device in accordance with claim 1, wherein the valve in the heating operating state changes between a plurality of different valve states.

11. The fuel cell device in accordance with claim 1, wherein the fuel cell device comprises a measuring device for determining an electrical internal resistance of an actuating device of the valve.

12. The fuel cell device in accordance with claim 1, wherein the at least one valve is configured as a medium shut-off valve, as a pressure-regulating valve, as a drainage valve, as a purge valve, or as a combined purge/drainage valve.

13. The fuel cell device in accordance with claim 1, wherein the fuel cell device comprises a pressure sensor and/or a concentration sensor, from the signal of which it is determinable whether a blockage due to ice formation is present in the media system, wherein the fuel cell device is switchable into the heating operating state or into the standard operating state in dependence on the result of the determination.

14. A method for operating a fuel cell device which comprises a media system for supplying fluid media to electrochemical units of the fuel cell device and/or for discharging fluid media from the electrochemical units of the fuel cell device, wherein the media system comprises at least one valve,
  wherein the method comprises the following:
  determining whether there is a risk of ice formation in the media system of the fuel cell device;
  switching the fuel cell device into a standard operating state or into a heating operating state in dependence on the result of the determination;
  supplying an electrical standard input power to the valve in order to maintain the valve in a desired valve state when the fuel cell device is in the standard operating state; and
  supplying an electrical heating input power to the valve when the fuel cell device is in the heating operating state;
  wherein the heating input power is greater than the standard input power, and
    wherein the valve is controlled by pulse width modulation in the heating operating state.

15. A fuel cell device, comprising a media system for supplying fluid media to electrochemical units of the fuel cell device and/or for discharging fluid media from the electrochemical units of the fuel cell device,
  wherein the media system comprises at least one valve to which, in a standard operating state of the fuel cell device, an electrical standard input power is suppliable in order to maintain the valve in a desired valve state,
  wherein the fuel cell device is switchable into a heating operating state in which an electrical heating input power that is greater than the electrical standard input power is suppliable to the at least one valve, and
  wherein the electrical heating input power suppliable to the valve in the heating operating state is below a switching threshold input power which is required for switching the valve into a different valve state.

16. A fuel cell device, comprising a media system for supplying fluid media to electrochemical units of the fuel cell device and/or for discharging fluid media from the electrochemical units of the fuel cell device,
  wherein the media system comprises at least one valve to which, in a standard operating state of the fuel cell device, an electrical standard input power is suppliable in order to maintain the valve in a desired valve state,
  wherein the fuel cell device is switchable into a heating operating state in which an electrical heating input power that is greater than the electrical standard input power is suppliable to the at least one valve, and
  wherein the valve in the heating operating state is able to be applied with an electrical heating voltage, the polarity of which is opposite to the polarity of an electrical switching voltage required for switching the valve into a different valve state.

17. A fuel cell device, comprising a media system for supplying fluid media to electrochemical units of the fuel cell device and/or for discharging fluid media from the electrochemical units of the fuel cell device,
  wherein the media system comprises at least one valve to which, in a standard operating state of the fuel cell device, an electrical standard input power is suppliable in order to maintain the valve in a desired valve state,
  wherein the fuel cell device is switchable into a heating operating state in which an electrical heating input power that is greater than the electrical standard input power is suppliable to the at least one valve, and
  wherein the fuel cell device comprises a pressure sensor and/or a concentration sensor, from the signal of which it is determinable whether a blockage due to ice formation is present in the media system, wherein the fuel cell device is switchable into the heating operating state or into the standard operating state in dependence on the result of the determination.

* * * * *